March 22, 1955 R. H. D. ROSIER 2,704,487
OPTICAL SYSTEM OF VARIABLE FOCAL LENGTH
Filed July 17, 1953
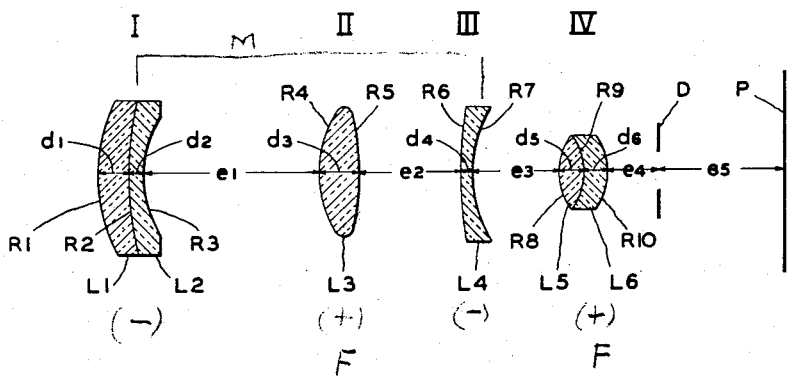
INVENTOR
*Raymond Henri Denis Rosier*
BY *Cameron, Kerkam & Sutton*
ATTORNEYS

United States Patent Office 2,704,487
Patented Mar. 22, 1955

2,704,487

OPTICAL SYSTEM OF VARIABLE FOCAL LENGTH

Raymond Henri Denis Rosier, Paris, France, assignor to Societe d'Optique et de Mecanique de Haute Precision, Paris, France, a joint-stock company of France Application July 17, 1953, Serial No. 368,565

Claims priority, application France July 22, 1952

1 Claim. (Cl. 88—57)

It is known that the focal length of a complex optical system can be progressively varied by displacing some of the component lenses along the optical axis. This provides a means for altering the size of the image produced by the system of a particular object.

In practice, however, it is generally necessary that alteration of the size of the image be possible while keeping the image in a fixed plane such, for example, as that of the sensitive layer of a photographic plate.

To fulfill this requirement, lens systems have been used comprising two lenses arranged for movement along the optical axis so that their relative displacements conform to a non-linear mathematical equation. This arrangement requires the use of control devices such as curved cams.

To eliminate the disadvantage of the use of cams or other control devices, it has been proposed, to insure substantial immobility of the plane of the image, to make use of a panchromatic system composed of a fixed divergent lens and of two convergent lenses arranged, one on each side of the divergent lens, and integrally connected one with the other. The focal length can then be varied very simply by axial translation of the group of two lenses. However, the real image formed by such a system is subjected to a small movement which is a function of the translation of that group. The plane of the image can be moved through the same position three times in the course of variation of the focal length from one extreme to the other by suitably choosing the powers of the lenses. The amplitude of displacement of the image plane thus can be maintained between two very close limits if the ratio of the extreme focal lengths is itself limited to about 3, for example.

The present invention is concerned with an optical system enabling the focal length to be progressively varied and giving a final real image which lies in practically a fixed plane.

The system in accordance with the invention has a set of three lenses (which may be simple or compound) comprising a fixed convergent lens disposed between two movable divergent lenses integrally connected for displacement together along the optical axis, and an objective lens having a positive focal length which produces, on a selected reduced scale, a final real image of the virtual image produced by the three-lens arrangement, any displacement of the real image along the optical axis consequent upon displacement of the virtual image being a fraction of the latter displacement.

An illustrative embodiment of an optical system in accordance with the present invention is shown in the accompanying drawing figure and is described hereinafter for purposes of illustrating the same.

The illustrative system comprises a fixed convergent lens generally indicated at II having on either side of it two divergent lenses generally indicated at I and III which can be displaced together relative to the fixed lens along the optical axis.

An objective lens of any kind having a positive focal length, such as the compound lens generally indicated at IV is provided for the three-lens arrangement I, II and III.

The displacement of the lens group I, III allows the focal length of the whole system to be varied. If the ratio of the extreme values of the focal length is, for example, to be 3, the ratio of the powers of the lenses III and II should be of the order of 1:3. The power of the lens I is not governed by that of the other lenses but is chosen in accordance with the separation of the lenses I and III.

The lens IV gives a final real image of the virtual image produced by the three-lens system I, II, III, which can be received by a photographic plate indicated at P.

If the lens IV is given such characteristics that the linear dimensions of the virtual image are reduced, say N times, the displacement of the plane of the final real image when the focal length is varied by displacement of the lenses I, III will be $N^2$ times as small as that of the virtual image and can be made negligible.

A suitable diaphragm D may be provided in the system and may be arranged in the objective part of the system, so that the numerical aperture of the system is not affected by variation of the focal length.

Divergent lens I may be a compound lens made up of two lenses $L_1$ and $L_2$. Lens $L_1$ has surfaces having radii $R_1$ and $R_2$ respectively and its thickness along the optical axis is represented by $d_1$. Lens $L_2$ has surfaces described by radii $R_2$ and $R_3$ respectively and its thickness along the optical axis is represented by $d_2$.

The convergent lens shown generally at II comprises a single lens $L_3$ described by radii $R_4$ and $R_5$ respectively and its thickness along the optical axis is represented by $d_3$. The distance between lenses I and II is indicated by $e_1$.

The divergent lens generally indicated at III comprises a single lens $L_4$ described by radii $R_6$ and $R_7$ and its thickness along the optical axis is designated by $d_4$. The distance between lenses II and III is represented by $e_2$.

The objective lens IV comprises a pair of lenses $L_5$ and $L_6$. Lens $L_5$ is described by radii $R_8$ and $R_9$ and its thickness along the optical axis is shown by $d_5$. Lens $L_6$ is described by radii $R_9$ and $R_{10}$ and its thickness along the optical axis is $d_6$. The distance between lenses III and IV is $e_3$.

The distance between lens IV and aperture D is $e_4$ and between aperture D and plate P is $e_5$.

The following table gives the optical characteristics of the illustrative system shown in the drawing and described above enabling the focal length of the system to be varied between 20 and 60 mm.:

| mm. | mm. | Refractive Index | Reciprocal of Dispersive Power |
|---|---|---|---|
| $R_1 = +72.43$ | $d_1 = 5$ | $N_1 = 1.73141$ | $V_1 = 28.4$ |
| $R_2 = +442.7$ | $d_2 = 2$ | $N_2 = 1.621$ | $V_2 = 36.3$ |
| $R_3 = +30.74$ | $e_1 = (24.087 - 57.837)$ | | |
| $R_4 = +38.58$ | $d_3 = 8$ | $N_3 = 1.621$ | $V_3 = 60.2$ |
| $R_5 = -711.7$ | $e_2 = (36.776 - 3.026)$ | | |
| $R_6 = +491.259$ | $d_4 = 2$ | $N_4 = 1.621$ | $V_4 = 60.2$ |
| $R_7 = +26.46$ | $e_3 = (2 - 35.75)$ | | |
| $R_8 = +22.1$ | $d_5 = 5.2$ | $N_5 = 1.621$ | $V_5 = 60.2$ |
| $R_9 = -14.2$ | $d_6 = 5.2$ | $N_6 = 1.73141$ | $V_6 = 28.4$ |
| $R_{10} = -57.95$ | $e_4 = 6$ | | |
| | $e_5 = 30,53$ | | |

In comparison with systems comprising two convergent lenses arranged for displacement relatively to one divergent lens, the use of two divergent lenses arranged for displacement relatively to one convergent lens has the particular advantage of allowing the diameters of the lenses to be reduced.

It will, of course, be understood that focusing onto near objects can be effected in the known manner by displacement of the movable lens I relatively to the movable lens III. Such displacement does not affect the size of the image.

What is claimed is:

In a variable focus optical system, a set of three lenses comprising a fixed convergent lens disposed between two movable divergent lenses integrally connected for displacement together along the optical axis without change in the distance between them, and an objective lens having a positive focal length which produces a final image on a selected reduced scale of the virtual image produced by the three-lens set having a variable focal length between 20 and 60 mm. and optical characteristics of the following order wherein R is the radii of the lens refracting surfaces, $d$ is the axial thickness of the lens elements, $e$ is the axial spacing of the lens elements, N is the refractive index of the several lens materials and V is the dispersion ratio of the lens materials:

| mm. | mm. | Refractive Index | Reciprocal of Dispersive Power |
|---|---|---|---|
| $R_1 = +72.43$ | $d_1 = 5$ | $N_1 = 1.73141$ | $V_1 = 28.4$ |
| $R_2 = +442.7$ | $d_2 = 2$ | $N_2 = 1.621$ | $V_2 = 36.3$ |
| $R_3 = +30.74$ | $e_1 = (24.087 - 57.837)$ | | |
| $R_4 = +38.58$ | $d_3 = 8$ | $N_3 = 1.621$ | $V_3 = 60.2$ |
| $R_5 = -711.7$ | $e_2 = (36.776 - 3.026)$ | | |
| $R_6 = +491.259$ | $d_4 = 2$ | $N_4 = 1.621$ | $V_4 = 60.2$ |
| $R_7 = +26.46$ | $e_3 = (2 - 35.75)$ | | |
| $R_8 = +22.1$ | $d_5 = 5.2$ | $N_5 = 1.621$ | $V_5 = 60.2$ |
| $R_9 = -14.2$ | $d_6 = 5.2$ | $N_6 = 1.73141$ | $V_6 = 28.4$ |
| $R_{10} = -57.95$ | $e_4 = 6$ | | |
| | $e_5 = 30.53$ | | |

References Cited in the file of this patent

UNITED STATES PATENTS

| | | |
|---|---|---|
| 2,165,341 | Capstaff et al. | July 11, 1939 |
| 2,235,634 | Gramatzki | Mar. 18, 1941 |
| 2,454,686 | Back | Nov. 23, 1948 |
| 2,501,219 | Hopkins | Mar. 21, 1950 |

FOREIGN PATENTS

| | | |
|---|---|---|
| 536,706 | Great Britain | May 23, 1941 |